United States Patent Office 3,236,860
Patented Feb. 22, 1966

3,236,860
WATER-SOLUBLE PHTHALOCYANINE DYE-STUFFS CONTAINING THIOSULFURIC ACID GROUPS
Werner Schultheis, Konigstein, Taunus, Kurt Schimmelschmidt, Frankfurt am Main, Hermann Hoffmann, Bad Soden, Taunus, and Edwin Baier, Frankfurt am Main, Germany, assignors to Farbwerke Hoechst Aktiengesellschaft vormals Meister Lucius & Brüning, Frankfurt am Main, Germany, a corporation of Germany
No Drawing. Filed Apr. 18, 1960, Ser. No. 22,719
Claims priority, application Germany, Apr. 24, 1959, F 28,299
4 Claims. (Cl. 260—314.5)

The present invention relates to new water-soluble organic dyestuffs containing one or more thiosulfuric acid groups and to a process for their manufacture; more particularly it relates to dyestuffs of the following general formulae

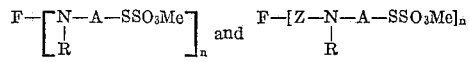

wherein F stands for the radical of an anthraquinone, oxazine, acridone, phenazine, diphenylmethane, triphenylmethane, phthalocyanine, metal phthalocyanine, azo or nitro dyestuff molecule, R represents a hydrogen atom or a hydrocarbon radical, A stands for an alkylene, cycloalkylene or arylalkylene radical which may contain ether, carbonyl, carboxylic acid ester, carboxylic acid amide or sulfonic acid amide groups, Z represents one of the bridge members —SO$_2$— or —CO—

Me represents an alkali metal atom or ammonium and $n$ the integers 1, 2, 3 or 4 while further groups imparting solubility in water, such, for example, as sulfonic acid groups may be present in the dyestuff molecule.

We have found that new water-soluble dyestuffs are obtained by condensing organic dyestuffs containing one or more reactive halogen groups and, if desired, groups imparting solubility in water, with aliphatic or aromatic amines containing one or more thiosulfuric acid groups and, if desired, further groups imparting solubility in water.

The condensation can be carried out in an aqueous or non-aqueous medium in the presence of acid-binding agents at temperatures within the range of about 0° C. and 60° C., preferably between 10° C. and 30° C., at a pH value between about 7 and 10, if desired with the addition of organic solvents such, for example, as acetone or methylene chloride. As acid-binding agents there may be used inorganic compounds such, for example, as sodium hydroxide solution, sodium carbonate or sodium bicarbonate, or organic compounds such, for example, as pyridine or picoline. The condensation in a non-aqueous medium can be carried out in an organic solvent such, for example, as dimethylformamide, whereby, if desired, other organic solvents such as methanol may be added. The reaction medium to be used in each individual case is selected according to the solubility properties of the amines used which contain thiosulfuric acid groups.

With regard to the yield to be obtained, the degree of purity of the product obtained and the condensation time it may be of advantage to use an excess of the amine component.

The dyestuffs serving as starting products and containing one or more reactive halogen groups may belong to the anthraquinone, acridone, phenazine, oxazine, diphenylmethane, triphenylmethane, azo, nitro and phthalocyanine series.

These dyestuffs may contain the reactive halogen atom in the form of sulfochloride groups such, for example, as the polysulfochlorides of dioxazine, the non-metalliferous phthalocyanine or the metalliferous phthalocyanines. Exemplary of this are furthermore the 1,4-diarylamino-anthraquinone-disulfonic acid chloride, the substitution products thereof (Deutsche Auslegeschrift 1,-052,604) and the azobenzene-disulfonic acid chloride.

The reactive halogen atom may also be bound to the dyestuff molecule in the form of the carboxylic acid halide group such, for example, as in the polycarboxylic acid chlorides of the phthalocyanine series, in the azobenzene-dicarboxylic acid chloride and in the anthanthrone-dicarboxylic acid dichloride of the following formula

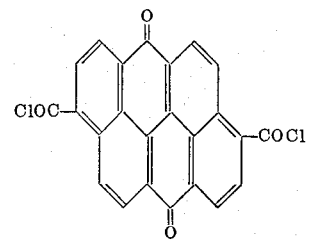

which is obtainable by reacting 1,1'-dinaphthyl-5,5',8,8'-tetracarboxylic acid with thionyl chloride.

The dyestuffs may also contain the reactive halogen atom bound to a triazine nucleus. The last-mentioned compounds are obtained according to known processes by partial condensation of cyanuric chloride with dyestuffs containing amino groups such, for example, as the reaction product of 1-amino-4-bromo-anthraquinone-2-sulfonic acid with para-phenylene-diamine or the coupling products of 2-amino-8-naphthol-6-sulfonic acid, 2-amino-5-naphthol-7-sulfonic acid or 1-amino-8-naphthol-3,6-disulfonic acid with diazotized water-insoluble or water-soluble aromatic amines which may also contain thiosulfuric acid groups as solubilizing groups.

As dyestuffs containing reactive halogen atoms there may furthermore be used those dyestuffs in which the halogen atom is not activated by a sulfonic acid group, a carboxyl group or a triazine nucleus, but directly bound to an aromatic nucleus of the dyestuff molecule such, for example, as in the 1-amino-4-bromo-anthraquinone-2-sulfonic acid or in the triphenylmethane derivative of the following formula

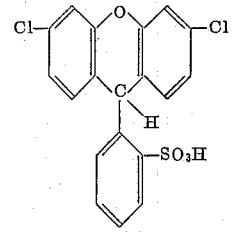

As amines containing one or more thiosulfuric acid groups there may be used both aliphatic amines (German Patent 869,066) such, for example, as 2-amino-ethyl-thiosulfuric acid, 2-(methyl-amino)-ethyl-thiosulfuric acid, 2,2'-imino-di-(ethyl-thiosulfuric acid), 3-amino-propyl-thiosulfuric acid or 2-amino-hexyl-thiosulfuric acid, and aromatic amines.

Exemplary of suitable aromatic amines are: 3-amino-phenyl-thiosulfuric acid, 3-amino-benzyl-thiosulfuric acid, 3-amino-4-methoxy-benzyl-thiosulfuric acid, 3-amino-4,6-dichloro-benzyl-thiosulfuric acid, 5-amino-naphthyl-(1)-methyl-thiosulfuric acid, 3-amino-acetophenone-ω-thiosulfuric acid, 4-amino-phenoxy-β-ethyl-thiosulfuric acid, 4- amino-phenyl-(ethyl-amino)-β-ethyl-thiosulfuric acid, 4-amino-acetanilide-ω-thiosulfuric acid, 4-aminophenyl-acetate-ω-thiosulfuric acid, 4-amino-phthalimino-β-ethyl-thiosulfuric acid, 4-amino-naphthalimino-β-ethyl-thiosulfuric acid, 4-amino-benzoylamino-γ-propyl-thiosulfuric acid, [N - (4 - amino-phenyl)-N'-methyl-β-ethylthiosulfuric acid] - urea, 4-amino-diphenyl-4'-sulfonylamino-β-ethyl-thiosulfuric acid, 4-amino-diphenylether-4'-carbonylamino-β-ethyl-thiosulfuric acid or salts of the 3-amino-benzene-sulfonyl imino-β,β'-di-(ethyl-thiosulfuric acid).

For the reaction with dyestuffs containing reactive halogen atoms there may also be used colored amines containing one or more thiosulfuric acid groups which can be obtained by coupling diazotized aromatic amines containing one or more thiosulfuric acid groups with compounds capable of being coupled and containing amino groups, such, for example, as meta-toluidine, 2-methoxy-5-methyl-aniline, meta-phenylene-diamine, 1-naphthylamine, 2-amino-8-naphthol-6-sulfonic acid, 2-amino-5-naphthol-7-sulfonic acid or 1-amino-8-naphthol-3,6-disulfonic acid or 1-(amino-phenyl)-3-methyl-pyrazolones. The coupling components on their part may also contain one or more thiosulfuric acid groups such as 5-amino-naphthyl-(1)-methyl-thiosulfuric acid or ethyl-aniline-ω-thiosulfuric acid.

The new water-soluble dyestuffs obtainable according to the process of the present invention are suitably prepared in the form of well crystallizing alkali or ammonium salts of the sulfur-alkyl or sulfur-aryl-thiosulfuric acid esters by concentration and/or salting out since the dyestuffs containing free thiosulfuric acid groups tend to instability unless they are prepared as inner salts. They dye wool, silk, polyamides and polyurethanes various tints from an acid bath. The dyeings mostly possess a good fastness to wet processing.

The following examples serve to illustrate the invention but they are not intended to limit it thereto, the parts being by weight unless otherwise stated, and the relationship of parts by weight to parts by volume being the same as that of the kilogram to the liter;

*Example 1*

A mixture of 19 parts of 1-amino-4-bromo-anthraquinone-2-sulfonic acid, 25 parts of 3-amino-4-methoxy-benzyl-thiosulfuric acid, 25 parts of sodium bicarbonate, 2 parts of cuprous chloride and 50 parts by volume of water is stirred for 20 hours at 30° C. The dyestuff solution is filtered off with suction from the solid substance and adjusted to a pH value of 10 by means of concentrated hydrochloric acid whereby the unreacted 3-amino-4-methoxy-benzyl-thiosulfuric acid crystallizes out. It is filtered off with suction and the filtrate is dropped into a cold mixture of equal parts by volume of methanol and concentrated hydrochloric acid whereby the dyestuff of the following formula

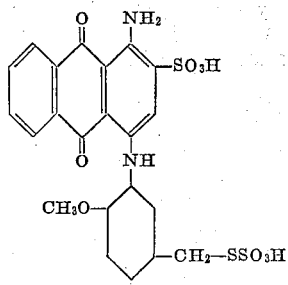

is precipitated as sodium salt in the form of coarse crystals. It easily dissolves in water to give a blue solution and dyes wool fast blue tints.

*Example 2*

A solution of 12.6 parts of 2-amino-ethyl-thiosulfuric acid in 20 parts by volume of water and 7.2 parts by volume of sodium hydroxide solution of 33% strength by weight is run at 0° C. into a mixture of 9.8 parts of the sulfochloride of the following formula

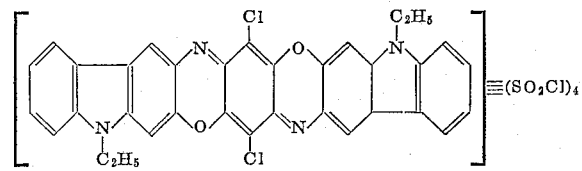

and 200 parts by volume of methylene chloride. After the addition of 100 parts by volume of acetone, the mixture is stirred for 15 hours at room temperature and the organic solvent is then evaporated under reduced pressure. The residue is taken up with water and the dyestuff of the following formula

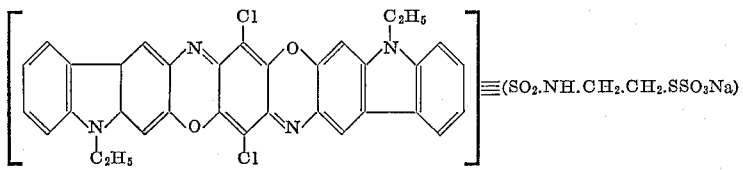

is separated by stirring with sodium chloride. It easily dissolves in water to give a reddish blue solution and dyes wool tints of good properties of fastness.

*Example 3*

A suspension of 16.2 parts of the dichloride of the following formula

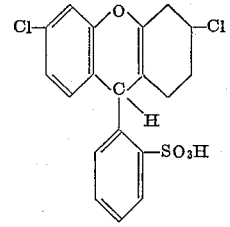

20 parts of 3-amino-4-methoxy-benzyl-thiosulfuric acid and 16.8 parts of sodium bicarbonate in 250 parts by volume of water is stirred for 10 hours at room temperature. The dyestuff formed which corresponds to the following formula

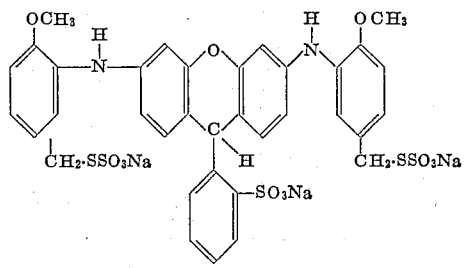

is then separated by stirring with sodium chloride. It precipitates in the form of light brown lamellae which easily dissolve in water to give a dark-red solution. The dyestuff possesses a good affinity for wool. The fastness to wet processing of the violet dyeings obtained is very good.

*Example 4*

5.7 parts of copper-phthalocyanine are converted into the trisulfochloride (U.S. Patent 2,219,330). The copper-phthalocyanine-trisulfochloride is suction-filtered and, while being wet, stirred for 4 hours at a temperature ranging from 50° C. to 55° C. together with 15 parts of 3-amino-4-methoxy-benzyl-thiosulfuric acid, 5.1 parts of sodium bicarbonate and 100 parts by volume of water. The dyestuff formed is separated by stirring with sodium chloride. It easily dissolves in water to give a blue-green solution and dyes poly-ε-caprolactam good properties of fastness.

*Example 5*

Copper-phthalocyanine-trisulfochloride prepared from 5.7 parts of copper-phthalocyanine is suction-filtered and, while being wet, stirred for 4 hours at a temperature ranging from 40° C. to 45° C. with 7.1 parts of methylamino-ethyl-thiosulfuric acid, 5.5 parts by volume of sodium hydroxide solution of 33% strength by weight and 100 parts by volume of water. The blue dyestuff formed is separated by stirring with sodium chloride. It easily dissolves in water to give a blue solution and dyes wool fast blue tints.

*Example 6*

A mixture of nickel-phthalocyanine-trisulfochloride prepared from 11.5 parts of nickel-phthalocyanine, 25 parts of 2-amino-ethyl-thiosulfuric acid, 40 parts by volume of water and 14.5 parts by volume of sodium hydroxide solution of 33% strength by weight is suction filtered and, while being wet, stirred for 15 hours at room temperature. The dyestuff formed is separated by stirring with sodium chloride. It easily dissolves in water to give a greenish blue solution and is well absorbed by wool.

If the 2-amino-ethyl-thiosulfuric acid is replaced by the coupling product of diazotized 3-amino-benzyl-thio-sulfuric acid with 1-(4'-amino-phenyl)-3-methyl-pyrazolone-(5), a green dyestuff is obtained.

*Example 7*

54 parts by volume of sodium hydoxide solution of 33% strength by weight are run at 20° C., while stirring, into a mixture of wet suction-filtered copper-phthalocyanine-trisulfochloride prepared from 57.5 parts of copper-phthalocyanine, 92 parts of 2-amino-ethyl-thiosulfuric acid and 300 parts by volume of water, and another 27 parts by volume of sodium hydroxide solution of 33% strength by weight are then added within 20 hours. The dyestuff formed is then separated by stirring with sodium chloride. It easily dissolves in water to give a blue solution and dyes wool blue tints of good properties of fastness.

*Example 8*

23 parts of the sodium salt of the condensation product of 1-amino-4-bromo-anthraquinone-2-sulfonic acid and metaphenylene-diamine which has been reacted with one mole of cyanuric chloride are suspended in a mixture of 300 parts by volume of water and 100 parts by volume of acetone. After the addition of 3.5 parts of sodium bicarbonate, a solution of 10 parts of 3-amino-4-methoxy-benzyl-thiosulfuric acid and 3.5 parts of sodium bicarbonate in 200 parts by volume of water is run into the suspension. The mixture is stirred for 2 hours ot 40° C. and the dyestuff formed is filtered with suction after cooling. It easily dissolves in water and dyes wool blue tints of good properties of fastness.

*Example 9*

A solution of 7.7 parts of azobenzene-4,4'-dicarboxylic acid dichloride in 250 parts by volume of methylene chloride is added to a mixture of 25 parts of 3-amino-4-methoxy-benzyl-thiosulfuric acid, 13 parts of sodium bicarbonate and 100 parts by volume of water, and the whole is stirred for 14 hours at room temperature. After removal of the methylene chloride, the reaction mixture is taken up with saturated sodium chloride solution and the dyestuff formed is vacuum filtered. It dyes wool yellow tints of good properties of fastness.

*Example 10*

A solution of 20 parts of β-amino-ethyl-thiosulfuric acid in 200 parts by volume of water is adjusted to a pH value of 7 to 8 by dropping in sodium hydroxide solution of 33% strength, and 400 parts by volume of methanol are added thereto. Into this solution are then introduced at a temperature within the range of 25° C. and 30° C. 58 parts of the sodium salt of the reaction product of 1-amino-4-bromo-anthraquinone-2-sulfonic acid and metaphenyldiamine condensed with 1 mole of cyanuric acid chloride, and the pH is maintained at a value of 7 to 8 by adding dropwise concentrated sodium hydroxide solution. The reaction product crystallizing during the reaction is filtered off after the addition of 20 parts by volume of saturated sodium chloride solution. There is obtained a blue dyestuff which dyes wool fast blue tints.

*Example 11*

300 parts by volume of methanol are added to a solution of 78 parts of β-amino-ethyl-thiosulfuric acid in 100 parts by volume of water and 30 parts by volume of sodium hydroxide solution of 33% strength. Moist suction-filtered tetraphenyl-copper-phthalocyanine-tetra-sulfochloride corresponding to an amount of 127 parts of dry tetraphenyl - copper - phthalocyanine - tetrasulfochloride is introduced at a temperature ranging from 25° C. to 30° C. into the above mixtures and the pH is maintained at a value of 9 to 95 by adding dropwise concentrated sodium hydroxide solution. The dyestuff formed is salted out after completion of the condensation. It dyes wool fast green tints.

*Example 12*

20 parts of 2,4-dinitro-1,5-difluorobenzene are introduced at a temperature ranging from 20° C. to 25° C. into a mixture of 47 parts of β-amino-ethyl-thiosulfuric acid, 60 parts by volume of water, 60 parts by volume of methanol and 15 parts by volume of sodium hydroxide solution of 33% strength and the pH is maintained at a value of 9 to 9.5 by adding dropwise sodium hydroxide solution. After completion of the condensation, the mixture is acidified with glacial acetic acid, concentrated by evaporation under reduced pressure and, after separation of sodium fluoride, the dyestuff formed which corresponds to the following formula

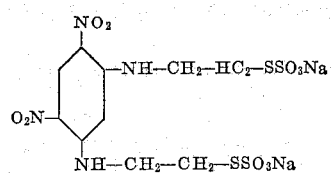

is precipitated with ethanol. It crystallizes to yield yellow lamellae which easily dissolve in water to give a yellow solution and possesses a good affinity for wool.

*Example 13*

Moist suction-filtered sulfochloride corresponding to an amount of 61 parts of dry 1,4-di-(4',4''-methylphenyl-amino)-anthraquinone-2',2''-disulfochloride is introduced at a temperature ranging from 20° C. to 25° C. into a mixture of 40 parts of β-amino-ethyl-thiosulfuric acid, 50 parts by volume of water and 15 parts by volume of sodium hydroxide solution of 33% strength by weight, and the pH is maintained at a value of 9 to 9.2 after addition of 100 parts by volume of acetone. After completion of the condensation, the solution is diluted with water to give the double volume and the dyestuff formed is salted out at a temperature of 60° C. by means of potassium chloride. It dyes wool fast grey tints.

Example 14

19.5 parts of the disulfochloride obtainable according to known methods from the coupling product of diazotized metanilic acid and 1 - (2' - chloro - 4' - sulfo - 6' - methyl-phenyl)-3-methyl-pyrazolone-(5) is introduced at a temperature ranging from 20° C. to 25° C. into a solution of 19 parts of methylamino-ethyl-thiosulfuric acid in 25 parts by volume of water which has been adjusted to a pH value of 9 by concentrated sodium hydroxide solution. After the addition of 80 parts by volume of acetone, the pH is maintained at a value of 9 to 9.2. The reaction mixture is adjusted to a pH value of 6 after completion of the condensation, evaporated under reduced pressure and the dyestuff formed is precipitated by means of sodium chloride. It dyes polyamides fast yellow tints.

Example 15

Into a mixture of 66 parts of the coupling product of diazotized 3-amino-benzene-sulfonylamino-$\beta$-ethyl-thiosulfuric acid and meta-toluidine, 30 parts of sodium bicarbonate, 50 parts by volume of water and 500 parts by volume of methanol there is introduced moist suction-filtered trisulfochloride in an amount corresponding to 33 parts of dry copper-phthalocyanine-trisulfochloride. After completion of the condensation, the dyestuff formed is precipitated by means of potassium chloride, filtered off and washed with methanol. It dyes wool fast green tints.

Example 16

78 parts of the acid trichloride obtainable according to known methods from the dyestuff corresponding to the following formula.

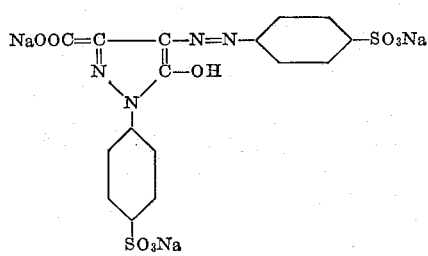

are introduced, at a temperature within the range of 20° C. to 25° C., into a mixture of 94 parts of $\beta$-amino-ethyl-thiosulfuric acid, 100 parts by volume of water and 60 parts by volume of potassium hydroxide solution of 30% strength by weight. The pH is maintained at a value of 9 to 9.5 until the condensation is complete by adding dropwise potassium hydroxide solution. The whole is then adjusted to a pH value of 6 by the addition of hydrochloric acid and the dyestuff formed is precipitated by the addition of potassium chloride. It dyes polyamide fibers fast golden yellow tints.

Example 17

Moist suction-filtered sulfochloride corresponding to an amount of 87 parts of dry copper phthalocyanine-trisulfochloride is introduced at a temperature within the range of 20° C. to 25° C. into a mixture of 88 parts of 3-amino-benzyl-thiosulfuric acid, 60 parts of sodium bicarbonate, 100 parts by volume of water and 400 parts by volume of methanol. After completion of the condensation and evaporation of the methanol, the whole is filled up with water to obtain 1,200 parts by volume of water and the dyestuff formed is precipitated by means of 170 parts of sodium chloride. It dyes wool fast greenish blue tints.

A dyestuff of similar properties is obtained when the 3-amino-benzyl-thiosulfuric acid in the above example is replaced by 3-amino-benzene-sulfonylamino-$\beta$-ethyl-thiosulfuric acid.

We claim:

1. The dyestuff of the following formula:

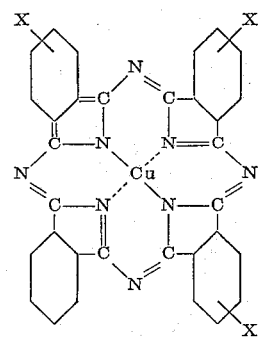

wherein X stands for the grouping $$-SO_2-NH-CH_2-CH_2-SSO_3Na$$

2. The dyestuff of the following formula

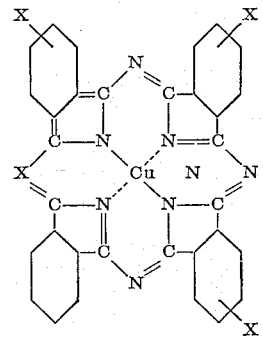

wherein X stands for the grouping

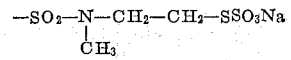

3. The dyestuff of the following formula:

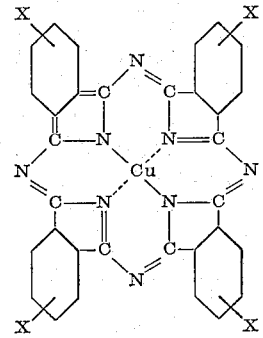

wherein X stands for the grouping

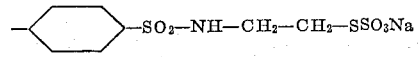

4. A water-soluble organic phthalocyanine dyestuff of the formula

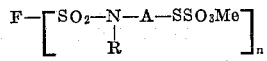

wherein F represents the radical of a phthalocyanine dyestuff selected from the group consisting of phthalocyanine, copper-phthalocyanine, nickel-phthalocyanine, and tetraphenyl copper-phthalocyanine, R represents a member of the group consisting of hydrogen and lower alkyl, A stands for a bivalent radical of the group consisting of lower alkylene,

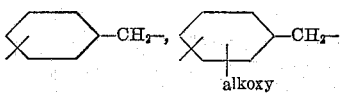

and

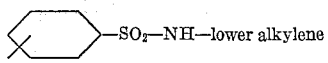

Me is a member of the group consisting of sodium, potassium and ammonium, and $n$ represents an integer from 1 to 4.

References Cited by the Examiner
UNITED STATES PATENTS

| | | | |
|---|---|---|---|
| 2,283,326 | 5/1942 | Felix et al. | 260—163 |
| 2,615,783 | 10/1952 | Haefele et al. | 8—128 |
| 3,000,762 | 9/1961 | Tesoro | 117—139.5 |
| 3,088,790 | 5/1963 | Schultheis et al. | 260—314.5 XR |

FOREIGN PATENTS

| | | |
|---|---|---|
| 563,199 | 6/1958 | Belgium. |
| 928,733 | 6/1955 | Germany. |

OTHER REFERENCES

Fiat Final Report No. 1313, vol. III, pages 357 to 362 (Feb. 1948). Lowy et al., "An Introduction to Organic Chemistry," 6th Ed., page 213 (1945).

Lubs, "Chemistry of Synthetic Dyes and Pigments," pages 611–612, Reinhold Publishing Corp. (N.Y.) (1955).

Milligan et al., "Textile Research Journal," vol. 31, pages 18–25 (January 1961).

Stahmann et al., J. Org. Chem. vol. 11, pp. 721, 722, and 731 (1946).

Wegmann, Textil-Praxis, 1958, pages 1056–1061.

WALTER A. MODANCE, *Primary Examiner*.

IRVING MARCUS, *Examiner*.